United States Patent
Kwon et al.

(10) Patent No.: US 10,957,087 B2
(45) Date of Patent: Mar. 23, 2021

(54) MOTION SYNTHESIS APPARATUS AND MOTION SYNTHESIS METHOD

(71) Applicant: NCSOFT CORPORATION, Seoul (KR)

(72) Inventors: Byungjun Kwon, Seongnam-si (KR); Moonwon Yu, Seongnam-si (KR); Hanyoung Jang, Seongnam-si (KR)

(73) Assignee: NCSOFT CORPORATION, Seoul (KR)

( * ) Notice: Subject to any disclaimer, the term of this patent is extended or adjusted under 35 U.S.C. 154(b) by 0 days.

(21) Appl. No.: 16/506,402

(22) Filed: Jul. 9, 2019

(65) Prior Publication Data

US 2020/0035008 A1   Jan. 30, 2020

(30) Foreign Application Priority Data

Jul. 30, 2018 (KR) .......................... 10-2018-0088621

(51) Int. Cl.
*G06T 13/40* (2011.01)
*G06T 7/246* (2017.01)

(52) U.S. Cl.
CPC .............. *G06T 13/40* (2013.01); *G06T 7/246* (2017.01); *G06T 2207/20084* (2013.01)

(58) Field of Classification Search
None
See application file for complete search history.

(56) References Cited

U.S. PATENT DOCUMENTS

| 2016/0232683 | A1* | 8/2016 | Kim .................. G06T 7/285 |
| 2017/0270387 | A1* | 9/2017 | Kulkarni et al. .... G06K 9/4604 |
| 2019/0138838 | A1* | 5/2019 | Liu .................. G06T 3/4053 |
| 2019/0251401 | A1* | 8/2019 | Shechtman .......... G06K 9/66 |

FOREIGN PATENT DOCUMENTS

KR         10-1501405 B1      3/2015

* cited by examiner

*Primary Examiner* — Tapas Mazumder
(74) *Attorney, Agent, or Firm* — Sughrue Mion, PLLC

(57) ABSTRACT

A motion synthesis motion synthesis method including: obtaining, by a motion synthesis apparatus, content feature values and style feature values according to content motion data and style motion data; generating, by the motion synthesis apparatus, target feature values using the obtained content feature values and style feature values; recognizing, by the motion synthesis apparatus, synthesized motion data and obtaining synthesized motion feature values from the recognized synthesized motion data; and obtaining, by the motion synthesis apparatus, loss by using the synthesized motion feature values and the target feature values and updating the synthesized motion data according to the obtained loss.

13 Claims, 7 Drawing Sheets

FIG. 6

MOTION SYNTHESIS APPARATUS AND MOTION SYNTHESIS METHOD

CROSS-REFERENCE TO RELATED APPLICATION

This application claims the benefit of Korean Patent Application No. 10-2018-0088621, filed on Jul. 30, 2018, in the Korean Intellectual Property Office, the disclosure of which is incorporated herein in its entirety by reference.

BACKGROUND

1. Field

One or more embodiments relate to a motion synthesis apparatus and a motion synthesis method, and more particularly, to a motion synthesis apparatus and a motion synthesis method that obtain loss using target feature values and synthesized motion feature values, and update synthesized motion data according to the obtained loss.

2. Description of the Related Art

Machine learning refers to a field of artificial intelligence that evolves from the study of pattern recognition and computer learning theory, and a field of developing algorithms and technologies that enable computers to learn.

Machine learning is a technology that studies and builds a system that improves its own performance by learning and predicting based on empirical data and algorithms for the system. Machine learning algorithms do not perform strictly defined static program commands, but rather take the form of building specific models to derive predictions or decisions based on input data.

At the heart of machine learning is representation and generalization. Representation refers to the evaluation of data, and generalization refers to processing of data that is not yet known. This is also the field of computational learning theory.

Deep learning is defined as a set of machine learning algorithms that attempt a high level of abstraction through a combination of various nonlinear transformation techniques, and in a big way, can be said to be a field of machine learning that teaches computers how people think.

Many studies have been conducted to represent data in a form that the computer can understand and apply it to learning, and as a result of these efforts, various deep learning techniques such as deep neural networks, convolutional deep neural networks, and deep belief networks have been applied to fields such as computer vision, speech recognition, natural language processing, and voice/signal processing to show cutting-edge results.

[Prior art document] Korean Patent Publication No. 10-1501405 (registered on Mar. 4, 2015)

SUMMARY

One or more embodiments include a motion synthesis apparatus and a motion synthesis method capable of updating synthesized motion data based on content motion data and style motion data.

One or more embodiments include a motion synthesis apparatus and a motion synthesis method capable of obtaining feature values using an untrained convolutional neural network.

Additional aspects will be set forth in part in the description which follows and, in part, will be apparent from the description, or may be learned by practice of the presented embodiments.

According to one or more embodiments, a motion synthesis method includes: obtaining, by a motion synthesis apparatus, content feature values and style feature values according to content motion data and style motion data; generating, by the motion synthesis apparatus, target feature values using the obtained content feature values and style feature values; recognizing, by the motion synthesis apparatus, synthesized motion data and obtaining synthesized motion feature values from the recognized synthesized motion data; and obtaining, by the motion synthesis apparatus, loss by using the synthesized motion feature values and the target feature values and updating the synthesized motion data according to the obtained loss.

Furthermore, the updating of the synthesized motion data may include: using a back-propagation algorithm until the synthesized motion feature values and the target feature values are matched.

Furthermore, the motion synthesis apparatus may obtain feature values using an untrained convolutional neural network.

Furthermore, the content motion data and the style motion data may be animation data.

Furthermore, the content motion data and the style motion data may include information about a bone.

Furthermore, the motion synthesis method may further include: obtaining style loss using the style feature values, and assigning a weight to the obtained style loss to generate the target feature values.

According to one or more embodiments, a motion synthesis apparatus includes a processor configured to: obtain content feature values and style feature values according to content motion data and style motion data; generate target feature values using the obtained content feature values and style feature values; recognize synthesized motion data and obtains synthesized motion feature values from the recognized synthesized motion data; and obtain loss by using the synthesized motion feature values and the target feature values and updates the synthesized motion data according to the obtained loss.

Furthermore, the updating of the synthesized motion data may include: using a back-propagation algorithm until the synthesized motion feature values and the target feature values are matched.

Furthermore, the processor may obtain feature values using an untrained convolutional neural network.

Furthermore, the content motion data and the style motion data may be animation data.

Furthermore, the content motion data and the style motion data may include information about a bone.

Furthermore, the motion synthesis apparatus may obtain style loss using the style feature values, and assign a weight to the obtained style loss to generate the target feature values.

BRIEF DESCRIPTION OF THE DRAWINGS

These and/or other aspects will become apparent and more readily appreciated from the following description of the embodiments, taken in conjunction with the accompanying drawings in which:

FIG. 6 is a view of an example of synthesizing motion using content motion and style motion according to an embodiment.

DETAILED DESCRIPTION

Figure 1:
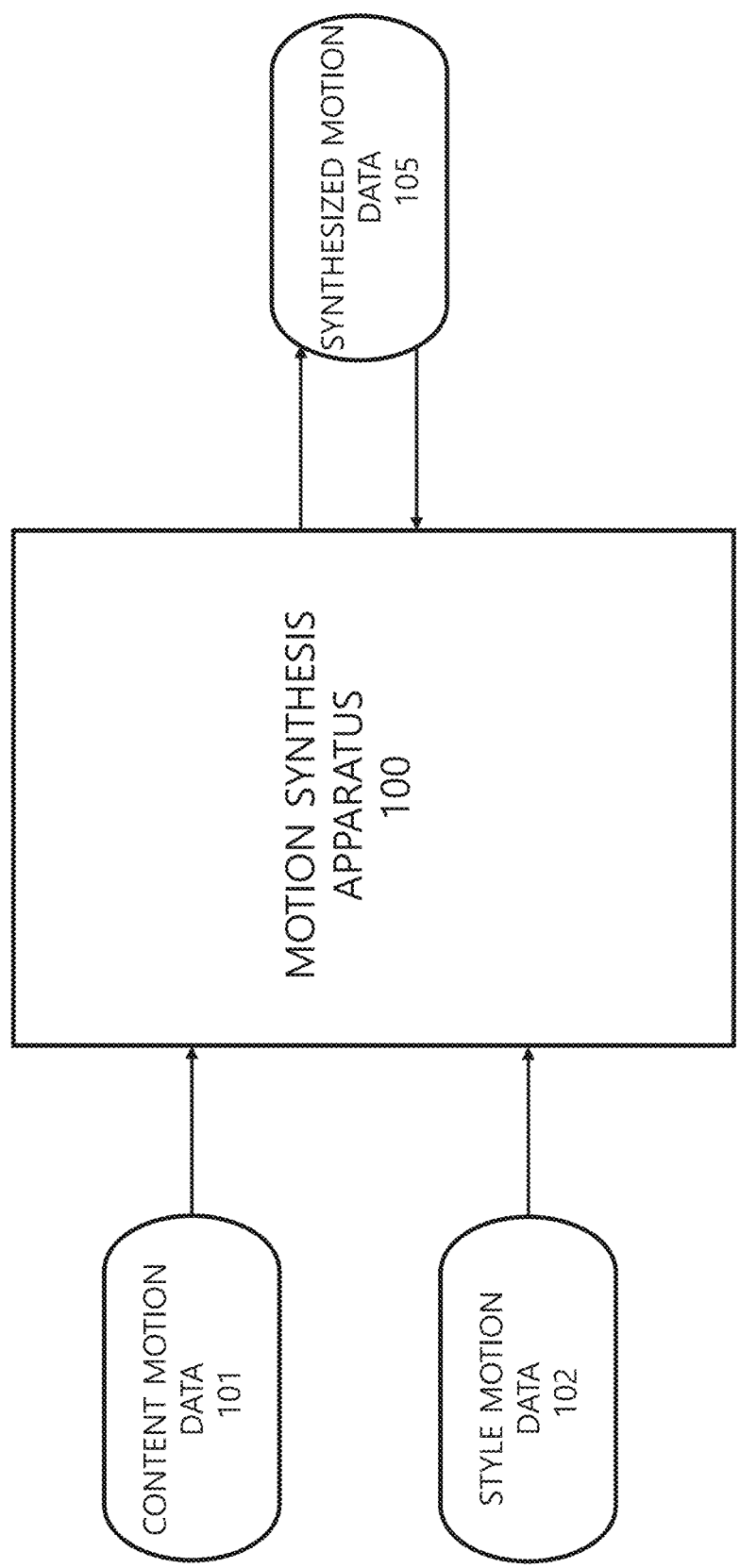
FIG. 1 is a view of an operation of a motion synthesis apparatus according to an embodiment.

Specific structural or functional descriptions for embodiments according to the concepts of the present disclosure disclosed herein are merely illustrative for the purpose of illustrating embodiments according to the concepts of the present disclosure. The embodiments according to the concept of the present disclosure may be implemented in various forms and are not limited to the embodiments described herein.

The embodiments according to the concept of the present disclosure can be variously modified and have various forms, so that the embodiments are illustrated in the drawings and described in detail herein. However, this does not limit the present disclosure within specific embodiments and it should be understood that the present disclosure covers all the modifications, equivalents, and replacements within the idea and technical scope of the present disclosure.

It will be understood that, although the terms first, second, etc. may be used herein to describe various elements, these elements should not be limited by these terms. These terms are only used to distinguish one element from another. For example, as long as within the scope of the present disclosure, a first element may be named as a second element, and the second element may be named as a first element.

Further, if it is described that one element is "connected" or "accesses" the other element, it is understood that the one element may be directly connected to or may directly access the other element but unless explicitly described to the contrary, another element may be "connected" or "access" between the elements. However, if it is described that one element is "directly connected" or "directly accesses" the other element, it is understood that there are no other elements exists between them. Other expressions that describe the relationship between elements, such as "between" and "directly between" or "adjacent to" and "directly adjacent to" should be understood as above.

The terms used in this application, only certain embodiments have been used to describe, is not intended to limit the present disclosure. As used herein, the singular forms "a", "an", and "the" are intended to include the plural forms as well, unless the context clearly indicates otherwise.

It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which embodiments belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, the same reference numerals denote the same components, and unnecessary redundant explanations and descriptions of known technologies will be omitted.

In the embodiment, 'communication', 'communication network' and 'network' may be used in the same sense. The three terms refer to wired and wireless local and wide area data communication networks capable of transmitting and receiving a file among a user terminal, terminals of other users, and a download server.

Hereinafter, preferred embodiments of the present disclosure will be described in detail with reference to the accompanying drawings.

FIG. 1 is a view of an operation of a motion synthesis apparatus according to an embodiment.

Referring to FIG. 1, a motion synthesis apparatus 100 according to an embodiment receives content motion data 101 and style motion data 102 and generates synthesized motion data 105.

It is preferable that the content motion data 101 and the style motion data 102 are input to the motion synthesis apparatus 100, respectively, and that the content motion data 101 and the style motion data 102 are different from each other.

The content motion data 101 and the style motion data 102 may have the same size.

The content motion data 101 may be animation data.

The content motion data 101 is preferably an action such as walking, running, or jumping, but is not limited thereto.

The content motion data 101 may include bone rotation information.

The content motion data 101 may include bone position information.

The content motion data 101 may include bone rotation information and bone position information.

Here, the bone may correspond to at least one of bones that make up the human body.

In addition, the bone may correspond to at least one of bones that make up an upper body or a lower body.

Furthermore, the bone may correspond to at least one of bones of portions of the human body that are arbitrarily classified as needed (e.g., according to a synthesized motion).

Also, the bone may correspond to at least one of a head, a spine, a left arm, a right arm, a left leg, and a right leg.

In addition, the bone may correspond to at least one of bones respectively constituting the head, the spine, the left arm, the right arm, the left leg, and the right leg.

The content motion data 101 may be indexed data.

The content motion data 101 may be data in which bone rotation information is indexed.

The content motion data 101 may be data in which bone position information is indexed.

The content motion data 101 may be data in which bone rotation information and bone position information are indexed.

The content motion data 101 may be data classified according to bone rotation information.

The content motion data 101 may be data classified according to bone position information.

The content motion data 101 may be data classified according to the bone rotation information and the bone position information.

The content motion data 101 may be data classified according to indexed bone rotation information.

The content motion data 101 may be data classified according to indexed bone position information.

The content motion data 101 may be data classified according to the indexed bone rotation information and the indexed bone position information.

The style motion data 102 may be animation data.

The style motion data 102 is preferably data representing motion (e.g., of characters, people holding guns, people holding two swords, ores, zombies, etc. in the game) in which the content motion data 101 can be synthesized.

The style motion data 102 may include bone rotation information.

The style motion data 102 may include bone position information.

The style motion data 102 may include the bone rotation information and the bone position information.

Here, the bone may correspond to at least one of bones that make up the human body.

In addition, the bone may correspond to at least one of bones that make up an upper body or a lower body.

Furthermore, the bone may correspond to at least one of bones of portions of the human body that are arbitrarily classified as needed (e.g., according to a synthesized motion).

Also, the bone may correspond to at least one of a head, a spine, a left arm, a right arm, a left leg, and a right leg.

In addition, the bone may correspond to at least one of bones respectively constituting the head, the spine, the left arm, the right arm, the left leg, and the right leg.

The style motion data 102 may be indexed data.

The style motion data 102 may be data in which bone rotation information is indexed.

The style motion data 102 may be data in which bone position information is indexed.

The style motion data 102 may be data in which the bone rotation information and the bone position information are indexed.

The style motion data 102 may be data classified according to bone rotation information.

The style motion data 102 may be data classified according to bone position information.

The style motion data 102 may be data classified according to the bone rotation information and the bone position information.

The style motion data 102 may be data classified according to indexed bone rotation information.

The style motion data 102 may be data classified according to indexed bone position information.

The style motion data 102 may be data classified according to the indexed bone rotation information and the indexed bone position information.

Figure 2:
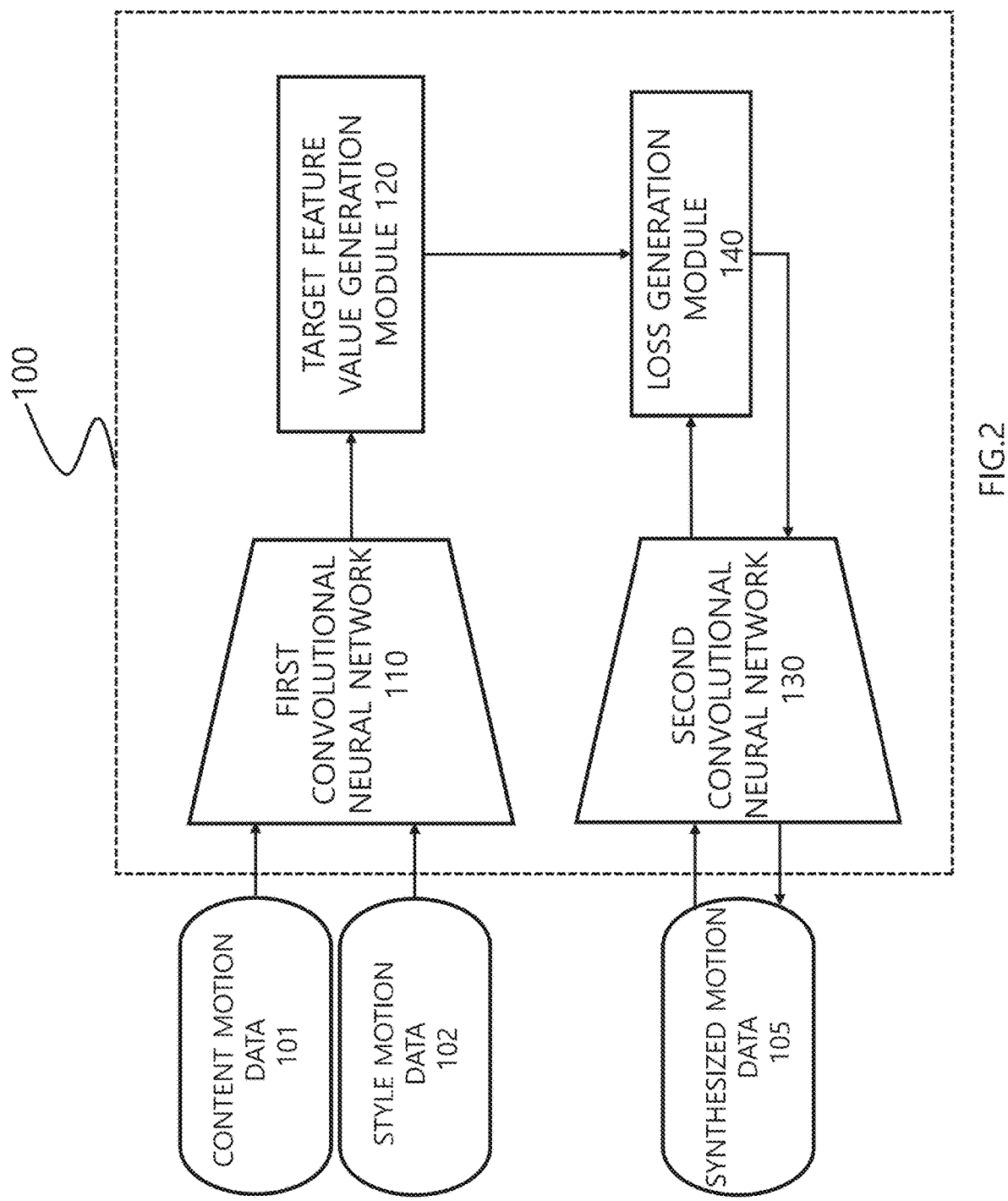
FIG. 2 is a view of a configuration of a motion synthesis apparatus according to an embodiment.
Figure 3:
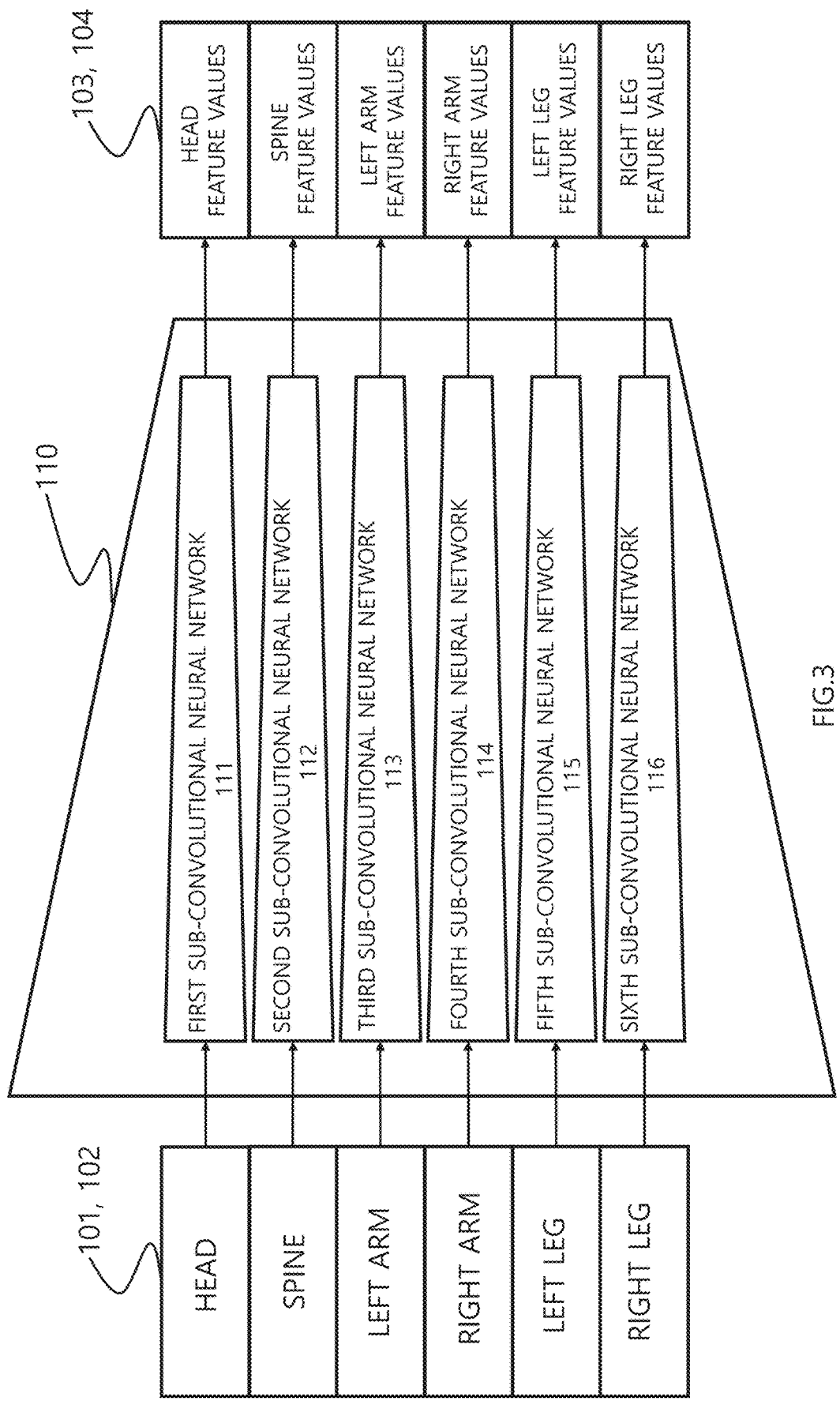
FIG. 3 is a view of a configuration of a first convolutional neural network according to an embodiment.

FIG. 2 is a view of a configuration of a motion synthesis apparatus according to an embodiment, and FIG. 3 is a view of a configuration of a first convolutional neural network according to an embodiment.

Referring to FIG. 2, the motion synthesis apparatus 100 according to an embodiment includes a first convolutional neural network 110, a target feature value generation module 120, a second convolutional neural network 130, and a loss generation module 140.

Referring to FIGS. 2 and 3, the first convolutional neural network 110 may include six sub-convolutional neural networks.

The first convolutional neural network 110 may be an untrained convolutional neural network according to an embodiment.

The first convolutional neural network 110 obtains the content motion data 101.

Here, the content motion data 101 may be data classified into bones that make up the human body according to indexed bone rotation information.

Also, the content motion data 101 may be data classified into bones that make up an upper body or a lower body according to the indexed bone rotation information.

Furthermore, the content motion data 101 may be data in which the bones that make up the human body are classified into bones of portions of the human body that are arbitrarily classified as needed (e.g., according to a synthesized motion) according to the indexed bone rotation information.

Furthermore, the content motion data 101 may be data classified into a head, a spine, a left arm, a right arm, and a left leg according to the indexed bone rotation information.

Furthermore, the content motion data 101 may be data classified into bones respectively constituting the head, the spine, the left arm, the right arm, and the left leg according to the indexed bone rotation information.

In addition, the content motion data 101 may be data classified into bones that make up the human body according to indexed bone position information.

Also, the content motion data 101 may be data classified into bones that make up an upper body or a lower body according to the indexed bone position information.

Furthermore, the content motion data 101 may be data in which the bones that make up the human body are classified into bones of portions of the human body that are arbitrarily classified as needed (e.g., according to a synthesized motion) according to the indexed bone rotation information.

Furthermore, the content motion data 101 may be data classified into a head, a spine, a left arm, a right arm, and a left leg according to the indexed bone position information.

Furthermore, the content motion data 101 may be data classified into bones respectively constituting the head, the spine, the left arm, the right arm, and the left leg according to the indexed bone position information.

In addition, the content motion data 101 may be data classified into bones that make up the human body according to indexed bone rotation information and bone position information.

Also, the content motion data 101 may be data classified into bones that make up an upper body or a lower body according to the indexed bone rotation information and the indexed bone position information.

Furthermore, the content motion data 101 may be data in which the bones that make up the human body are classified into bones of portions of the human body that are arbitrarily classified as needed (e.g., according to a synthesized motion) according to the indexed bone rotation information and the indexed bone position information.

Furthermore, the content motion data 101 may be data classified into a head, a spine, a left arm, a right arm, and a left leg according to the indexed bone rotation information and the indexed bone position information.

Furthermore, the content motion data 101 may be data classified into bones respectively constituting the head, the spine, the left arm, the right arm, and the left leg according to the indexed bone rotation information and the indexed bone position information.

The first convolutional neural network 110 obtains content feature values according to the content motion data 101.

The first convolutional neural network 110 may obtain the content feature values according to the content motion data 101 classified according to the indexed bone rotation information.

The first convolutional neural network 110 may obtain the content feature values according to the content motion data 101 classified according to the indexed bone position information.

The first convolutional neural network 110 may obtain the content feature values according to the content motion data 101 classified according to the indexed bone rotation information and the indexed bone position information.

The first convolutional neural network 110 may include a plurality of sub-convolutional neural networks.

The first convolutional neural network 110 may include as many sub-convolutional neural networks as the number of bones that make up the human body.

The first convolutional neural network 110 may include two sub-convolutional neural networks corresponding to an upper body or a lower body.

The first convolutional neural network 110 may include sub-convolutional neural networks corresponding to the number of portions of the human body that are arbitrarily classified as needed (e.g., according to a synthesized motion).

The first convolutional neural network 110 may include six sub-convolutional neural networks respectively corresponding to a head, a spine, a left arm, a right arm, a left leg, and a right leg.

The first convolutional neural network 110 may match the content motion data 101 with the sub-convolutional neural networks.

The first convolutional neural network 110 may match the content motion data 101 classified according to the indexed bone rotation information with the sub-convolutional neural networks of the same number as the number of bones that make up the human body included in the first convolutional neural network 110.

The first convolutional neural network 110 may match the content motion data 101 classified according to the indexed bone rotation information with the two sub-convolutional neural networks corresponding to the upper body or the lower body included in the first convolutional neural network 110.

The first convolutional neural network 110 may match the content motion data 101 classified according to the indexed bone rotation information with the sub-convolutional neural networks corresponding to the number of portions, which are arbitrarily classified as needed (e.g., according to the synthesized motion), of the human body included in the first convolutional neural network 110.

The first convolutional neural network 110 may match the content motion data 101 classified according to the indexed bone position information with the sub-convolutional neural networks of the same number as the number of bones that make up the human body included in the first convolutional neural network 110.

The first convolutional neural network 110 may match the content motion data 101 classified according to the indexed bone position information with the two sub-convolutional neural networks corresponding to the upper body or the lower body included in the first convolutional neural network 110.

The first convolutional neural network 110 may match the content motion data 101 classified according to the indexed bone position information with the sub-convolutional neural networks corresponding to the number of portions, which are arbitrarily classified as needed (e.g., according to the synthesized motion), of the human body included in the first convolutional neural network 110.

The first convolutional neural network 110 may match the content motion data 101 classified according to the indexed bone rotation information and the indexed bone position information with the sub-convolutional neural networks of the same number as the number of bones that make up the human body included in the first convolutional neural network 110.

The first convolutional neural network 110 may match the content motion data 101 classified according to the indexed bone rotation information and the indexed bone position information with the two sub-convolutional neural networks corresponding to the upper body or the lower body included in the first convolutional neural network 110.

The first convolutional neural network 110 may match the content motion data 101 classified according to the indexed bone rotation information and the indexed bone position information with the sub-convolutional neural networks corresponding to the number of portions, which are arbitrarily classified as needed (e.g., according to the synthesized motion), of the human body included in the first convolutional neural network 110.

The first convolutional neural network 110 may match the content motion data 101 classified according to the indexed bone rotation information with six sub-convolutional neural networks 111, 112, 113, 114, 115, and 116 included in the first convolutional neural network 110.

The first convolutional neural network 110 may match the content motion data 101 classified according to the indexed bone position information with the six sub-convolutional neural networks 111, 112, 113, 114, 115, and 116 included in the first convolutional neural network 110.

The first convolutional neural network 110 may match the content motion data 101 classified according to the indexed bone rotation information and the indexed bone position information with the six sub-convolutional neural networks 111, 112, 113, 114, 115, and 116 included in the first convolutional neural network 110.

The first convolutional neural network 110 may match the content motion data 101 classified into a head with the first sub-convolutional neural network 111, according to an embodiment.

The first sub-convolutional neural network 111 may obtain head feature values from the content motion data 101 classified into the head that is matched according to an embodiment.

The first convolutional neural network 110 may match the content motion data 101 classified into a spine with the second sub-convolutional neural network 112, according to an embodiment.

The second convolutional neural network 110 may obtain spine feature values from the content motion data 101 classified into the spine that is matched according to an embodiment.

The first convolutional neural network 110 may match the content motion data 101 classified into a left arm with the third sub-convolutional neural network 113, according to an embodiment.

The third sub-convolutional neural network 113 may obtain left arm feature values from the content motion data 101 classified into the left arm that is matched according to an embodiment.

The first convolutional neural network 110 may match the content motion data 101 classified into a right arm with the fourth sub-convolutional neural network 114, according to an embodiment.

The fourth sub-convolutional neural network 114 may obtain right arm feature values from the content motion data 101 classified into the right arm that is matched according to an embodiment.

The first convolutional neural network 110 may match the content motion data 101 classified into a left leg with the fifth sub-convolutional neural network 115, according to an embodiment.

The fifth sub-convolutional neural network 115 may obtain left leg feature values from the content motion data 101 classified into the left leg that is matched according to an embodiment.

The first convolutional neural network 110 may match the content motion data 101 classified into a right leg with the sixth sub-convolutional neural network 116, according to an embodiment.

The sixth sub-convolutional neural network 116 may obtain right leg feature values from the content motion data 101 classified into the right leg that is matched according to an embodiment.

The first convolutional neural network 110 may obtain content feature values 103 using head feature values, spine feature values, left arm feature values, right arm feature values, left leg feature values, and right leg feature values.

The content feature values 103 obtained by the first convolutional neural network 110 may be referred to as a content feature map.

The content feature values 103 obtained by the first convolutional neural network 110 may be referred to as a content vector.

An array of the content feature values 103 obtained by the first convolutional neural network 110 may be referred to as a content vector.

The first convolutional neural network 110 obtains the style motion data 102.

Here, the style motion data 102 may be data classified into bones that make up the human body according to indexed bone rotation information.

Also, the style motion data 102 may be data classified into bones that make up an upper body or a lower body according to the indexed bone rotation information.

Furthermore, the style motion data 102 may be data in which the bones that make up the human body are classified into bones of portions of the human body that are arbitrarily classified as needed (e.g., according to a synthesized motion) according to the indexed bone rotation information.

Furthermore, the style motion data 102 may be data classified into a head, a spine, a left arm, a right arm, and a left leg according to the indexed bone rotation information.

Furthermore, the style motion data 102 may be data classified into bones respectively constituting the head, the spine, the left arm, the right arm, and the left leg according to the indexed bone rotation information.

In addition, the style motion data 102 may be data classified into bones that make up the human body according to indexed bone position information.

Also, the style motion data 102 may be data classified into bones that make up an upper body or a lower body according to the indexed bone position information.

Furthermore, the style motion data 102 may be data in which the bones that make up the human body are classified into bones of portions of the human body that are arbitrarily classified as needed (e.g., according to a synthesized motion) according to the indexed bone position information.

Furthermore, the style motion data 102 may be data classified into a head, a spine, a left arm, a right arm, and a left leg according to the indexed bone position information.

Furthermore, the style motion data 102 may be data classified into bones respectively constituting the head, the spine, the left arm, the right arm, and the left leg according to the indexed bone position information.

In addition, the style motion data 102 may be data classified into bones that make up the human body according to indexed bone rotation information and bone position information.

Also, the style motion data 102 may be data classified into bones that make up an upper body or a lower body according to the indexed bone rotation information and the indexed bone position information.

Furthermore, the style motion data 102 may be data in which the bones that make up the human body are classified into bones of portions of the human body that are arbitrarily classified as needed (e.g., according to a synthesized motion) according to the indexed bone rotation information and the indexed bone position information.

Furthermore, the style motion data 102 may be data classified into a head, a spine, a left arm, a right arm, and a left leg according to the indexed bone rotation information and the indexed bone position information.

Furthermore, the style motion data 102 may be data classified into bones respectively constituting the head, the spine, the left arm, the right arm, and the left leg according to the indexed bone rotation information and the indexed bone position information.

The first convolutional neural network 110 obtains style feature values according to the style motion data 102.

The first convolutional neural network 110 may obtain the style feature values according to the style motion data 102 classified according to the indexed bone rotation information.

The first convolutional neural network 110 may obtain the style feature values according to the style motion data 102 classified according to the indexed bone position information.

The first convolutional neural network 110 may obtain the style feature values according to the style motion data 102 classified according to the indexed bone rotation information and the indexed bone position information.

The first convolutional neural network 110 may match the style motion data 102 with the sub-convolutional neural networks.

The first convolutional neural network 110 may match the style motion data 102 classified according to the indexed bone rotation information with the sub-convolutional neural networks of the same number as the number of bones that make up the human body included in the first convolutional neural network 110.

The first convolutional neural network 110 may match the style motion data 102 classified according to the indexed bone rotation information with the two sub-convolutional neural networks corresponding to the upper body or the lower body included in the first convolutional neural network 110.

The first convolutional neural network 110 may match the style motion data 102 classified according to the indexed bone rotation information with the sub-convolutional neural networks corresponding to the number of portions, which are arbitrarily classified as needed (e.g., according to the synthesized motion), of the human body included in the first convolutional neural network 110.

The first convolutional neural network 110 may match the style motion data 102 classified according to the indexed bone rotation information with the sub-convolutional neural networks of the same number as the number of bones that make up the human body included in the first convolutional neural network 110.

The first convolutional neural network 110 may match the style motion data 102 classified according to the indexed bone position information with the two sub-convolutional neural networks corresponding to the upper body or the lower body included in the first convolutional neural network 110.

The first convolutional neural network 110 may match the style motion data 102 classified according to the indexed bone position information with the sub-convolutional neural networks corresponding to the number of portions, which are arbitrarily classified as needed (e.g., according to the synthesized motion), of the human body included in the first convolutional neural network 110.

The first convolutional neural network 110 may match the style motion data 102 classified according to the indexed bone rotation information and the indexed bone position information with the sub-convolutional neural networks of the same number as the number of bones that make up the human body included in the first convolutional neural network 110.

The first convolutional neural network 110 may match the style motion data 102 classified according to the indexed bone rotation information and the indexed bone position information with the two sub-convolutional neural networks corresponding to the upper body or the lower body included in the first convolutional neural network 110.

The first convolutional neural network 110 may match the style motion data 102 classified according to the indexed bone rotation information and the indexed bone position information with the sub-convolutional neural networks corresponding to the number of portions, which are arbitrarily classified as needed (e.g., according to the synthesized motion), of the human body included in the first convolutional neural network 110.

The first convolutional neural network 110 may match the style motion data 102 classified according to the indexed bone rotation information with the six sub-convolutional neural networks 111, 112, 113, 114, 115, and 116 included in the first convolutional neural network 110.

The first convolutional neural network 110 may match the style motion data 102 classified according to the indexed bone position information with the six sub-convolutional neural networks 111, 112, 113, 114, 115, and 116 included in the first convolutional neural network 110.

The first convolutional neural network 110 may match the style motion data 102 classified according to the indexed bone rotation information and the indexed bone position information with the six sub-convolutional neural networks 111, 112, 113, 114, 115, and 116 included in the first convolutional neural network 110.

The first convolutional neural network 110 may match the style motion data 102 classified into a head with the first sub-convolutional neural network 111, according to an embodiment.

The first sub-convolutional neural network 111 may obtain head feature values from the style motion data 102 classified into the head that is matched according to an embodiment.

The first convolutional neural network 110 may match the style motion data 102 classified into a spine with the second sub-convolutional neural network 112, according to an embodiment.

The second convolutional neural network 110 may obtain spine feature values from the style motion data 102 classified into the spine that is matched according to an embodiment.

The first convolutional neural network 110 may match the style motion data 102 classified into a left arm with the third sub-convolutional neural network 113, according to an embodiment.

The third sub-convolutional neural network 113 may obtain left arm feature values from the style motion data 102 classified into the left arm that is matched according to an embodiment.

The first convolutional neural network 110 may match the style motion data 102 classified into a right arm with the fourth sub-convolutional neural network 114, according to an embodiment.

The fourth sub-convolutional neural network 114 may obtain right arm feature values from the style motion data 102 classified into the right arm that is matched according to an embodiment.

The first convolutional neural network 110 may match the style motion data 102 classified into a left leg with the fifth sub-convolutional neural network 115, according to an embodiment.

The fifth sub-convolutional neural network 115 may obtain left leg feature values from the style motion data 102 classified into the left leg that is matched according to an embodiment.

The first convolutional neural network 110 may match the style motion data 102 classified into a right leg with the sixth sub-convolutional neural network 116, according to an embodiment.

The sixth sub-convolutional neural network 116 may obtain right leg feature values from the style motion data 102 classified into the right leg that is matched according to an embodiment.

The first convolutional neural network 110 may obtain style feature values 104 using head feature values, spine feature values, left arm feature values, right arm feature values, left leg feature values, and right leg feature values.

The style feature values 104 obtained by the first convolutional neural network 110 may be referred to as a style feature map.

The style feature values 104 obtained by the first convolutional neural network 110 may be referred to as a style vector.

An array of the style feature values 104 obtained by the first convolutional neural network 110 may be referred to as a style vector.

The target feature value generation module 120 generates target feature values using the content feature values 103 and the style feature values 104 obtained by the first convolutional neural network 110.

The target feature value generation module 120 may generate F (t) corresponding to the target feature values using Equation 1 below.

$$F(t) = \operatorname*{argmin}_{t} \sum_{i \in parts} \overbrace{MSE((F(t_i) - F(c_i))}^{\text{content loss}} + \qquad \text{[Equation 1]}$$

-continued $$\overline{\alpha_i MSE(\text{Gram}(t_i) - \text{Gram}(s_i))}^{\text{weighted style loss}}$$

where $\alpha$ is user-defined weight vector, Gram = $(F^T \cdot F)/n$

Where i is an index, and respective i values may be indexed by body part (e.g., a head, a spine, a left arm, a right arm, a left leg, and a right leg).

In Equation 1, $$\overline{MSE((F(t_i) - F(c_i))}^{\text{content loss}}$$

part is content loss. The content loss denotes a difference between target feature values and content feature values.

The content loss may vary by body part.

The content loss may vary by body part in which the respective i values are indexed.

In the content loss, MSE is a mean square error.

In Equation 1, $$\overline{\alpha_i MSE(\text{Gram}(t_i) - \text{Gram}(s_i))}^{\text{weighted style loss}}$$

part is weighted style loss. The weighted style loss denotes a difference between target feature values and style feature values.

The weighted style loss may vary by body part.

The weighted style loss may vary by body part in which the respective i values are indexed.

In the weighted style loss, MSE is a mean square error.

A weight $\alpha_i$ may be assigned differently to each of body parts in which the respective i values are indexed.

Therefore, the weighted style loss for each of the body parts may be modified by modifying the weight $\alpha_i$ assigned to each of the body parts.

The degree to which the weighted style loss is reflected in the target feature values may be adjusted by the weight $\alpha_i$.

The degree to which the style feature values are reflected in the target feature values may be adjusted by the weight $\alpha_i$.

Synthesized motion data may be modified by adjusting the degree to which the style feature values are reflected in the target feature values using the weight $\alpha_i$.

That is, when the weight $\alpha_i$ is modified, the weighted style loss for each of the body parts is modified.

Further, when the weighted style loss for each of the body parts is modified, the target feature values for each of the body parts are modified according to the modified weighted style loss for each of the body parts.

When the target feature values for each of the body parts are modified, the synthesized motion data updated using the modified target feature values for each of the body parts are modified for each of the body parts.

In Equation (1), argmin is used to generate a vector for minimizing an error at a value obtained by adding the content loss and the weighted style loss.

The target feature values generated by the target feature value generation module 120 may be a vector.

Figure 4:
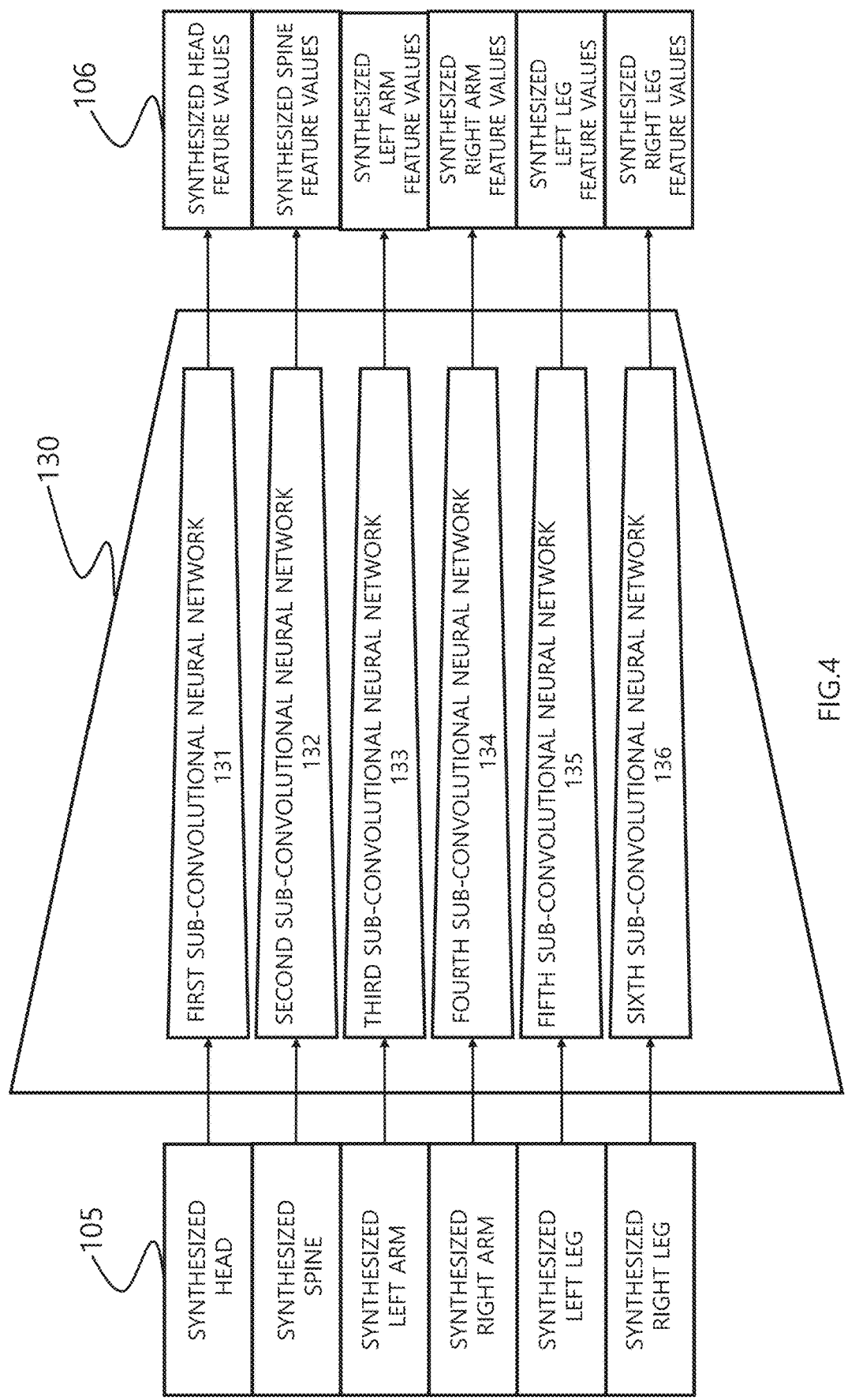
FIG. 4 is a view of a configuration of a second convolutional neural network according to an embodiment.

FIG. 4 is a view of a configuration of a second convolutional neural network according to an embodiment.

Referring again to FIGS. 2 and 4, the second convolutional neural network 130 may include six sub-convolutional neural networks.

The second convolutional neural network 130 may be an untrained convolutional neural network according to an embodiment.

The second convolutional neural network 130 obtains the synthesized motion data 105.

The synthesized motion data 105 may be animation data.

The synthesized motion data 105 may be noise data having the same size as the content motion data 101.

The synthesized motion data 105 may be motion data having the same size as the content motion data 101.

The synthesized motion data 105 may be noise data having the same size as the style motion data 102.

The synthesized motion data 105 may be motion data having the same size as the style motion data 102.

The synthesized motion data 105 may include bone rotation information.

The synthesized motion data 105 may include bone position information.

The synthesized motion data 105 may include bone rotation information and bone position information.

Here, the bone may correspond to at least one of bones that make up the human body.

In addition, the bone may correspond to at least one of bones that make up an upper body or a lower body.

Furthermore, the bone may correspond to at least one of bones of portions of the human body that are arbitrarily classified as needed (e.g., a synthesized motion).

Also, the bone may correspond to at least one of a head, a spine, a left arm, a right arm, a left leg, and a right leg.

In addition, the bone may correspond to at least one of bones respectively constituting the head, the spine, the left arm, the right arm, the left leg, and the right leg.

The synthesized motion data 105 may be indexed data.

The synthesized motion data 105 may be data in which bone rotation information is indexed.

The synthesized motion data 105 may be data in which bone position information is indexed.

The synthesized motion data 105 may be data in which bone rotation information and bone position information are indexed.

The synthesized motion data 105 may be data classified according to bone rotation information.

The synthesized motion data 105 may be data classified according to bone position information.

The synthesized motion data 105 may be data classified according to bone rotation information and bone position information.

The synthesized motion data 105 may be data classified according to indexed bone rotation information.

The synthesized motion data 105 may be data classified according to indexed bone position information.

The synthesized motion data 105 may be data classified according to the indexed bone rotation information and the indexed bone position information.

The second convolutional neural network 130 obtains the synthesized motion data 105.

Here, the synthesized motion data 105 may be data classified into bones that make up the human body according to the indexed bone rotation information.

Also, the synthesized motion data 105 may be data classified into bones that make up an upper body or a lower body according to the indexed bone rotation information.

Furthermore, the synthesized motion data 105 may be data in which the bones that make up the human body are classified into bones of portions of the human body that are arbitrarily classified as needed (e.g., according to a synthesized motion) according to the indexed bone rotation information.

Furthermore, the synthesized motion data 105 may be data classified into a head, a spine, a left arm, a right arm, and a left leg according to the indexed bone rotation information.

Furthermore, the synthesized motion data 105 may be data classified into bones respectively constituting the head, the spine, the left arm, the right arm, and the left leg according to the indexed bone rotation information.

In addition, the synthesized motion data 105 may be data classified into bones that make up the human body according to the indexed bone position information.

Also, the synthesized motion data 105 may be data classified into bones that make up an upper body or a lower body according to the indexed bone position information.

Furthermore, the synthesized motion data 105 may be data in which the bones that make up the human body are classified into bones of portions of the human body that are arbitrarily classified as needed (e.g., according to a synthesized motion) according to the indexed bone position information.

Furthermore, the synthesized motion data 105 may be data classified into a head, a spine, a left arm, a right arm, and a left leg according to the indexed bone position information.

Furthermore, the synthesized motion data 105 may be data classified into bones respectively constituting the head, the spine, the left arm, the right arm, and the left leg according to the indexed bone position information.

In addition, the synthesized motion data 105 may be data classified into bones that make up the human body according to the indexed bone rotation information and the indexed bone position information.

Also, the synthesized motion data 105 may be data classified into bones that make up an upper body or a lower body according to the indexed bone rotation information and the indexed bone position information.

Furthermore, the synthesized motion data 105 may be data in which the bones that make up the human body are classified into bones of portions of the human body that are arbitrarily classified as needed (e.g., according to a synthesized motion) according to the indexed bone rotation information and the indexed bone position information.

Furthermore, the synthesized motion data 105 may be data classified into a head, a spine, a left arm, a right arm, and a left leg according to the indexed bone rotation information and the indexed bone position information.

Furthermore, the synthesized motion data 105 may be data classified into bones respectively constituting the head, the spine, the left arm, the right arm, and the left leg according to the indexed bone rotation information and the indexed bone position information.

The second convolutional neural network 130 obtains synthesized motion feature values according to the synthesized motion data 105.

The second convolutional neural network 130 may obtain synthesized motion feature values according to the synthesized motion data 105 classified according to the indexed bone rotation information.

The second convolutional neural network 130 may obtain synthesized motion feature values according to the synthesized motion data 105 classified according to the indexed bone position information.

The second convolutional neural network 130 may obtain synthesized motion feature values according to the synthesized motion data 105 classified according to the indexed bone rotation information and the indexed bone position information.

The second convolutional neural network 130 may include a plurality of sub-convolutional neural networks.

The second convolutional neural network 130 may include as many sub-convolutional neural networks as the number of bones that make up the human body.

The second convolutional neural network 130 may include two sub-convolutional neural networks corresponding to an upper body or a lower body.

The second convolutional neural network 130 may include sub-convolutional neural networks corresponding to the number of portions of the human body that are arbitrarily classified as needed (e.g., according to a synthesized motion).

The second convolutional neural network 130 may include six sub-convolutional neural networks respectively corresponding to a head, a spine, a left arm, a right arm, a left leg, and a right leg.

The second convolutional neural network 130 may match the synthesized motion data 105 with the sub-convolutional neural networks.

The second convolutional neural network 130 may match the synthesized motion data 105 classified according to the indexed bone rotation information with the sub-convolutional neural networks of the same number as the number of bones that make up the human body included in the second convolutional neural network 130.

The second convolutional neural network 130 may match the synthesized motion data 105 classified according to the indexed bone rotation information with the two sub-convolutional neural networks corresponding to the upper body or the lower body included in the second convolutional neural network 130.

The second convolutional neural network 130 may match the synthesized motion data 105 classified according to the indexed bone rotation information with the sub-convolutional neural networks corresponding to the number of portions of the human body included in second convolutional neural network 130 that are arbitrarily classified as needed (e.g., according to the synthesized motion).

The second convolutional neural network 130 may match the synthesized motion data 105 classified according to the indexed bone position information with the sub-convolutional neural networks of the same number as the number of bones that make up the human body included in the second convolutional neural network 130.

The second convolutional neural network 130 may match the synthesized motion data 105 classified according to the indexed bone position information with the two sub-convolutional neural networks corresponding to the upper body or the lower body included in the second convolutional neural network 130.

The second convolutional neural network 130 may match the synthesized motion data 105 classified according to the indexed bone position information with the sub-convolutional neural networks corresponding to the number of portions of the human body included in second convolutional neural network 130 that are arbitrarily classified as needed (e.g., according to the synthesized motion).

The second convolutional neural network 130 may match the synthesized motion data 105 classified according to the indexed bone rotation information and the indexed bone position information with the sub-convolutional neural networks of the same number as the number of bones that make up the human body included in the second convolutional neural network 130.

The second convolutional neural network 130 may match the synthesized motion data 105 classified according to the indexed bone rotation information and the indexed bone position information with the two sub-convolutional neural networks corresponding to the upper body or the lower body included in the second convolutional neural network 130.

The second convolutional neural network 130 may match the synthesized motion data 105 classified according to the indexed bone rotation information and the indexed bone position information with the sub-convolutional neural networks corresponding to the number of portions of the human body included in second convolutional neural network 130 that are arbitrarily classified as needed (e.g., according to the synthesized motion).

The second convolutional neural network 130 may match the synthesized motion data 105 classified according to the indexed bone rotation information with six sub-convolutional neural networks 131, 132, 133, 134, 135, and 136 included in the second convolutional neural network 130.

The second convolutional neural network 130 may match the synthesized motion data 105 classified according to the indexed bone position information with the six sub-convolutional neural networks 131, 132, 133, 134, 135, and 136 included in the second convolutional neural network 130.

The second convolutional neural network 130 may match the synthesized motion data 105 classified according to the indexed bone rotation information and the indexed bone position information with the six sub-convolutional neural networks 131, 132, 133, 134, 135, and 136 included in the second convolutional neural network 130.

The second convolutional neural network 130 may match the synthesized motion data 105 classified into a synthesized head with the first sub-convolutional neural network 131, according to an embodiment.

The first sub-convolutional neural network 131 may obtain synthesized head feature values from the synthesized motion data 105 classified into the synthesized head that is matched according to an embodiment.

The second convolutional neural network 130 may match the synthesized motion data 105 classified into a synthesized spine with the second sub-convolutional neural network 132, according to an embodiment.

The second sub-convolutional neural network 132 may obtain synthesized spine feature values from the synthesized motion data 105 classified into the synthesized spine that is matched according to an embodiment.

The second convolutional neural network 130 may match the synthesized motion data 105 classified into a synthesized left arm with the third sub-convolutional neural network 133, according to an embodiment.

The third sub-convolutional neural network 133 may obtain synthesized left arm feature values from the synthesized motion data 105 classified into the synthesized left arm that is matched according to an embodiment.

The second convolutional neural network 130 may match the synthesized motion data 105 classified into a synthesized right arm with the fourth sub-convolutional neural network 134, according to an embodiment.

The fourth sub-convolutional neural network 134 may obtain synthesized right arm feature values from the synthesized motion data 105 classified into the synthesized right arm that is matched according to an embodiment.

The second convolutional neural network 130 may match the synthesized motion data 105 classified into a synthesized left leg with the fifth sub-convolutional neural network 135, according to an embodiment.

The fifth sub-convolutional neural network 135 may obtain synthesized left leg feature values from the synthesized motion data 105 classified into the synthesized left leg that is matched according to an embodiment.

The second convolutional neural network 130 may match the synthesized motion data 105 classified into a synthesized right leg with the sixth sub-convolutional neural network 136, according to an embodiment.

The sixth sub-convolutional neural network 136 may obtain synthesized right leg feature values from the synthesized motion data 105 classified into the synthesized right leg that is matched according to an embodiment.

The second convolutional neural network 130 may obtain synthesized motion feature values 106 using synthesized head feature values, synthesized spine feature values, synthesized left arm feature values, synthesized right arm feature values, synthesized left leg feature values, and synthesized right leg feature values.

According to another embodiment, the number of sub-convolutional neural networks (not shown) included in the second convolutional neural network 130 may be equal to the number of bones that make up the human body according to the synthesized motion data 105 classified according to the indexed bone rotation information.

According to another embodiment, the number of sub-convolutional neural networks (not shown) included in the second convolutional neural network 130 may be two corresponding to an upper body and a lower body according to the synthesized motion data 105 classified according to the indexed bone rotation information.

According to another embodiment, the number of sub-convolutional neural networks (not shown) included in the second convolutional neural network 130 may correspond to the number of bones of portions of the human body that are arbitrarily classified as needed (e.g., according to a synthesized motion) according to the indexed bone rotation information.

The synthesized motion feature values 106 obtained by the second convolutional neural network 130 may be referred to as a synthesized motion feature map.

The synthesized motion feature values 106 obtained by the second convolutional neural network 130 may be referred to as a synthesized motion vector.

An array of the synthesized motion feature values 106 obtained by the second convolutional neural network 130 may be referred to as a synthesized motion vector.

According to another embodiment, it is also possible to implement the first convolutional neural network 110 and the second convolutional neural network 130 as one convolutional neural network.

The loss generation module 140 may obtain loss using the synthesized motion feature values 106 and target feature values.

The loss generation module 140 may obtain the loss using Equation 2 below.

$$\text{loss} = \text{MSE}(F(\text{syn}) - F(t)) \qquad \text{[Equation 2]}$$

Using the above Equation 2, the loss generation module 140 may obtain loss having a minimum difference between the synthesized motion feature values and the target feature values.

In Equation 2, MSE is a mean square error.

The loss generation module 140 may repeatedly update the synthesized motion data according to the obtained loss.

The loss generation module 140 may repeatedly update the synthesized motion data using a back-propagation algorithm.

The loss generation module 140 may repeatedly update the synthesized motion data until the synthesized motion feature values and the target feature values are matched using the back-propagation algorithm.

Figure 5:
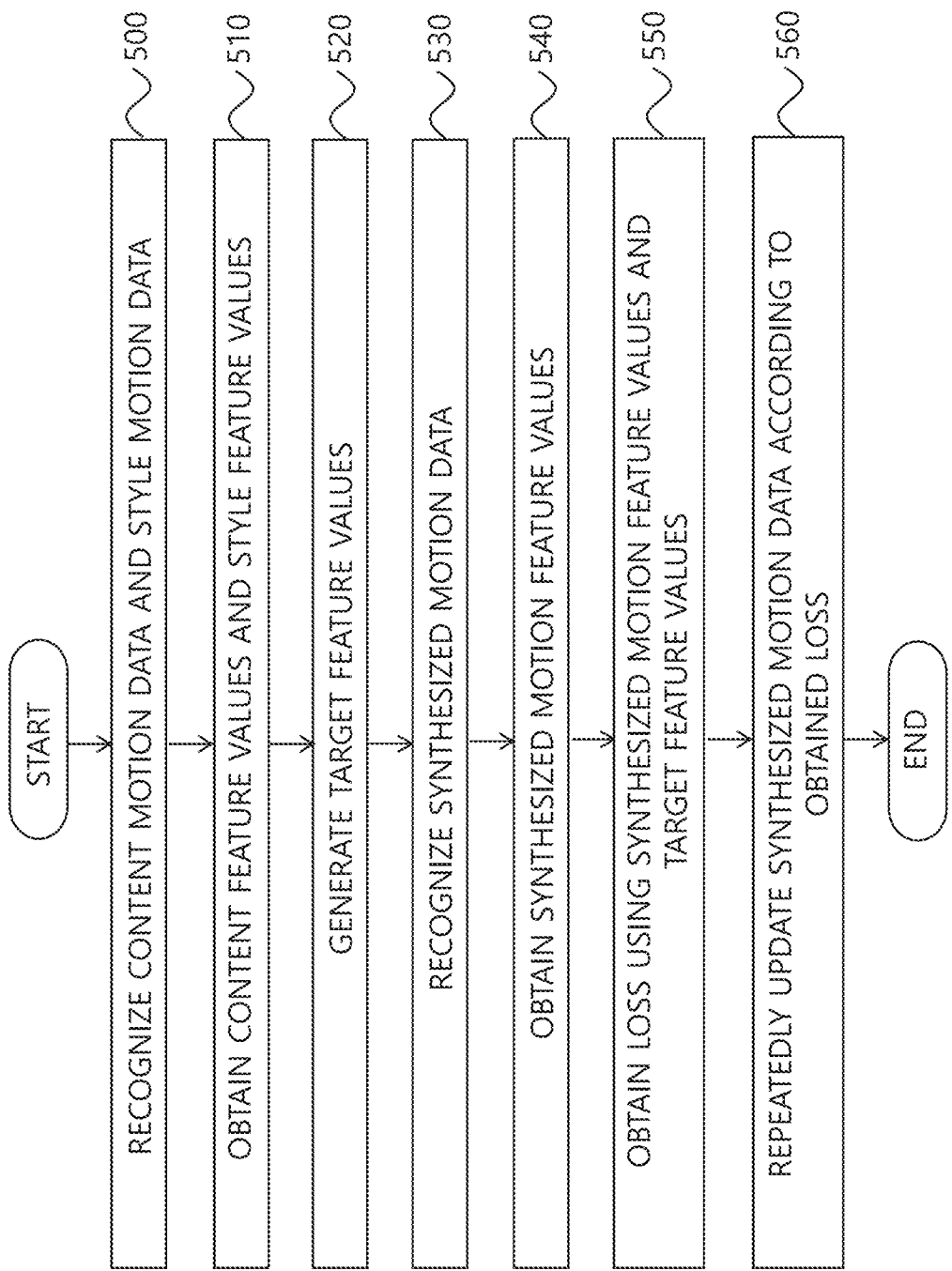
FIG. 5 is a flowchart illustrating a motion synthesis method according to an embodiment.

FIG. 5 is a flowchart illustrating a motion synthesis method according to an embodiment.

Referring to FIG. 5, in operation 500, a motion synthesis apparatus recognizes content motion data and style motion data.

Here, the content motion data and the style motion data may be animation data.

In addition, the content motion data and the style motion data may be data classified according to indexed bone rotation information.

In operation 510, the motion synthesis apparatus obtains content feature values and style feature values.

Here, the motion synthesis apparatus may obtain the content feature values or the style feature values using head feature values, spine feature values, left arm feature values, right arm feature values, left leg feature values, and right leg feature values.

In operation 520, the motion synthesis apparatus generates target feature values.

Here, the motion synthesis apparatus may generate the target feature values using a difference between the target feature values and the content feature values, and a difference between the target feature values and the style feature values.

In operation 530, the motion synthesis apparatus recognizes synthesized motion data.

Here, the synthesized motion data may be animation data.

Furthermore, the synthesized motion data may be data classified according to indexed to bone rotation information.

In operation 540, the motion synthesis apparatus obtains synthesized motion feature values.

Here, the motion synthesis apparatus may obtain the synthesized motion feature values using the head feature values, the spine feature values, the left arm feature values, the right arm feature values, the left leg feature values, and the right leg feature values.

In operation 550, the motion synthesis apparatus obtains loss using the synthesized motion feature values and the target feature values.

Here, the motion synthesis apparatus may obtain loss using the difference between the synthesized motion feature values and the target feature values.

In operation 560, the motion synthesis apparatus repeatedly updates the synthesized motion data according to the obtained loss.

Here, the motion synthesis apparatus may repeatedly update the synthesized motion data until the synthesized motion feature values and the target feature values are matched using a back-propagation algorithm.

FIG. 6 is a view of an example of synthesizing motion using content motion and style motion according to an embodiment.

Referring to FIG. 6(*a*), content motion data according to an embodiment are animation data representing running motions of a human being.

Referring to FIG. 6(*b*), style motion data according to an embodiment are animation data representing motions of a character standing with his upper body slightly leaning, the character created such that the content motion data (FIG. 6(*a*)) can be synthesized.

Referring to FIG. 6(*c*), the synthesized motion data according to an embodiment are animation data representing motions in which the content motion data (FIG. 6(*a*)) representing the running motions of a human being and the style motion data (FIG. 6(*b*)) representing the motions of a created character standing with his upper body slightly leaning are synthesized.

That is, the synthesized motion data become animation data representing motions of the created character running with his upper body slightly leaning.

Figure 7:
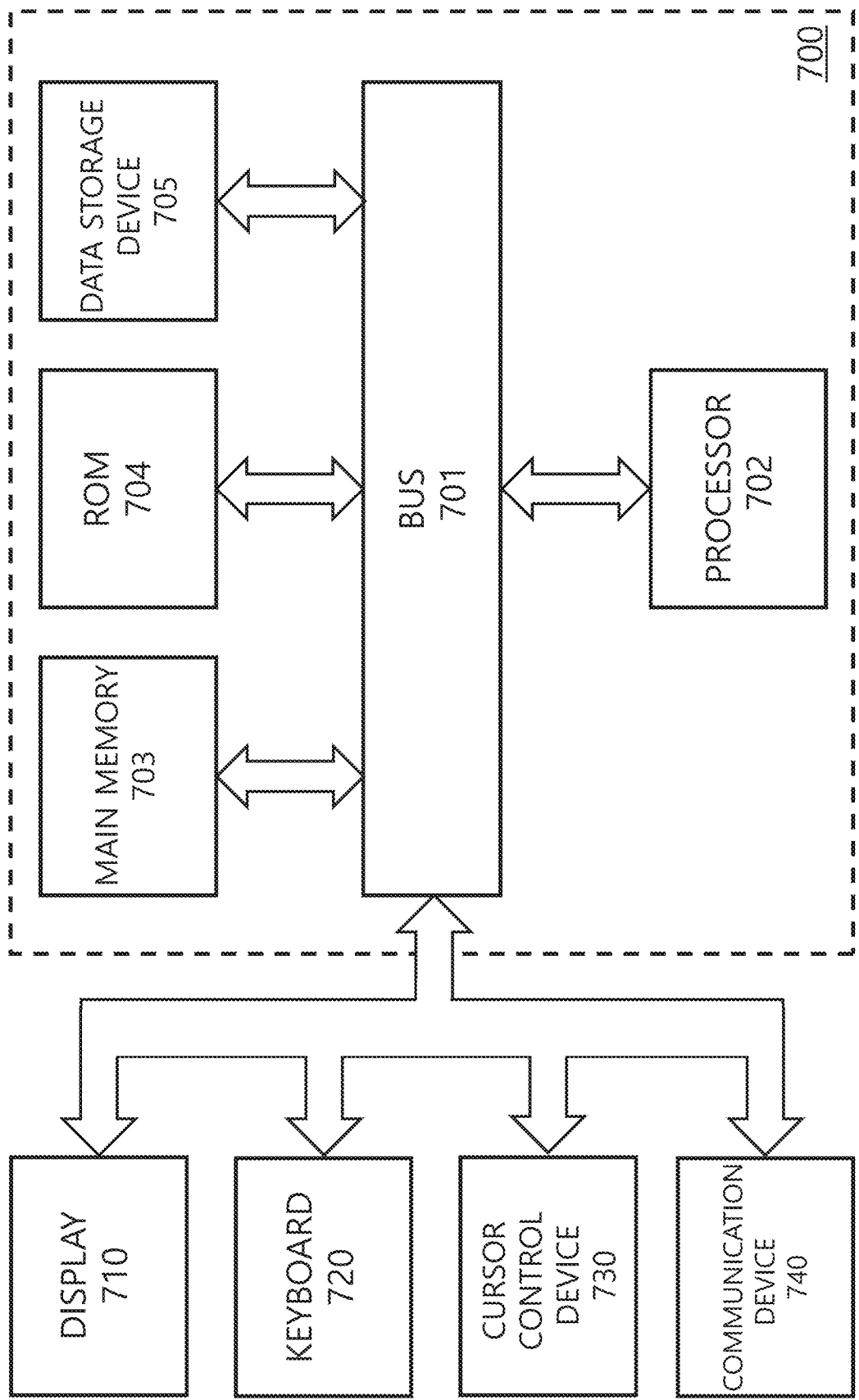
FIG. 7 is a block diagram of an exemplary computer system for implementing an embodiment.

FIG. 7 is a block diagram of an exemplary computer system for implementing an embodiment.

Referring to FIG. 7, an exemplary computer system for implementing an embodiment includes a bus or another communication channel 701 for exchanging information, and a processor 702 is coupled to the bus 701 for processing information.

A computer system 700 includes random access memory (RAM) or a main memory 703, which is another dynamic storage device, coupled to the bus 701 to store information and commands processed by the processor 702.

Also, the main memory 703 may also be used to store temporary variables or other intermediate information during execution of commands by the processor 702.

The computer system 700 may include read only memory (ROM) or another static storage device 704 coupled to the bus 701 to store static information or commands for the processor 702.

A data storage device 705, such as a magnetic disk, a zip, or an optical disk, and a drive corresponding to the data storage device 705 may also be coupled to the computer system 700 for storing information and commands.

The computer system 700 may be coupled to a display 710, such as a cathode-ray tube or a liquid crystal device (LCD), via the bus 701 to display information to an end user.

A character input device, such as a keyboard 720, may be coupled to the bus 701 for transmitting information and commands to the processor 702.

Another type of user input device is a cursor control device 730, such as a mouse, a trackball, or cursor direction keys, for transmitting direction information and command selections to the processor 702 and for controlling the movement of a cursor on the display 710.

A communication device 740 is also coupled to the bus 701.

The communication device 740, to support connection to a local or wide area network, may include an interface device used for connection to a modem, a network interface card, Ethernet, a token ring, or another type of physical coupling material. In this manner, the computer system 700 may be connected to multiple clients and servers over a conventional network infrastructure such as the Internet.

Hereinabove, all components according to the embodiments of the present disclosure are described to be combined as one or are described to operate by being combined with each other, but an embodiment is not limited thereto. In other words, at least two of the components may selectively combine to operate within the scopes of the present disclosure.

Also, the components may each be realized as independent hardware, or some or all of the components may be selectively combined to be realized as a computer program having a program module in which some or all functions are performed in one or more hardware. Codes and code segments for configuring the computer program may be easily construed by one of ordinary skill in the art to which embodiments belong.

Such a computer program may be stored in a computer readable medium, read and executed by a computer, thereby implementing an embodiment. Examples of the computer readable medium of the computer program may be a magnetic recording medium, an optical recording medium, or the like.

Furthermore, when a part "includes", "comprises", or "has" an element, unless there is a particular description contrary thereto, the part can further include other elements, not excluding the other elements.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The description herein is for the purpose of describing the inventive concept and numerous modifications and adaptations will be readily apparent to one of ordinary skill in the art without departing from the spirit and scope of the present disclosure.

In this regard, the present embodiments may have different forms and should not be construed as being limited to the descriptions set forth herein. While the present disclosure has been particularly shown and described with reference to embodiments thereof, it will be understood that various changes in form and details may be made therein without departing from the spirit and scope of the following claims.

What is claimed is:

1. A motion synthesis method comprising:
   obtaining, by a motion synthesis apparatus, content feature values and style feature values according to content motion data and style motion data of an object;
   generating, by the motion synthesis apparatus, target feature values using the obtained content feature values and style feature values;
   recognizing, by the motion synthesis apparatus, synthesized motion data and obtaining synthesized motion feature values from the recognized synthesized motion data; and
   obtaining, by the motion synthesis apparatus, loss by using the synthesized motion feature values and the target feature values and updating the synthesized motion data according to the obtained loss,
   wherein the generating the target feature values comprising generating a vector for minimizing an error in a value obtained by adding a content loss and a weighted style loss, the content loss indicating a difference between the target feature values and the content feature values and the weighted style loss indicating a difference between the target feature values and the style feature values, to which a weight is applied.

2. The motion synthesis method of claim 1, wherein the updating of the synthesized motion data comprises: using a back-propagation algorithm until the synthesized motion feature values and the target feature values are matched.

3. The motion synthesis method of claim 1, wherein the motion synthesis apparatus obtains feature values using an untrained convolutional neural network.

4. The motion synthesis method of claim 1, wherein the content motion data and the style motion data are animation data.

5. The motion synthesis method of claim 1, wherein the content motion data and the style motion data comprise information about a bone.

6. The motion synthesis method of claim 1, wherein the content loss and the weighted style loss are respectively indexed according to each part of the object.

7. The motion synthesis method of claim 6, wherein a different value of the weight is assigned according to each part of the object in which each of the weighted style loss is indexed.

8. The motion synthesis method of claim 1, wherein the motion synthesis apparatus obtains the content feature values and the style feature values by providing the content motion data and the style motion data as an input to one convolutional neural network.

9. A motion synthesis apparatus, the motion synthesis apparatus comprising a processor configured to:
   obtain content feature values and style feature values according to content motion data and style motion data of an object;
   generate target feature values using the obtained content feature values and style feature values;
   recognize synthesized motion data and obtains synthesized motion feature values from the recognized synthesized motion data; and
   obtain loss by using the synthesized motion feature values and the target feature values and updates the synthesized motion data according to the obtained loss,
   wherein the processor is further configured to generate the target feature values by generating a vector for minimizing an error in a value obtained by adding a content loss and a weighted style loss, the content loss indicating a difference between the target feature values and the content feature values and the weighted style loss indicating a difference between the target feature values and the style feature values, to which a weight is applied.

10. The motion synthesis apparatus of claim 9, wherein the updating of the synthesized motion data comprises: using a back-propagation algorithm until the synthesized motion feature values and the target feature values are matched.

11. The motion synthesis apparatus of claim 9, wherein the processor is configured to obtain feature values using an untrained convolutional neural network.

12. The motion synthesis apparatus of claim 9, wherein the content motion data and the style motion data are animation data.

13. The motion synthesis apparatus of claim 9, wherein the content motion data and the style motion data comprise information about a bone.

* * * * *